Figure 1:
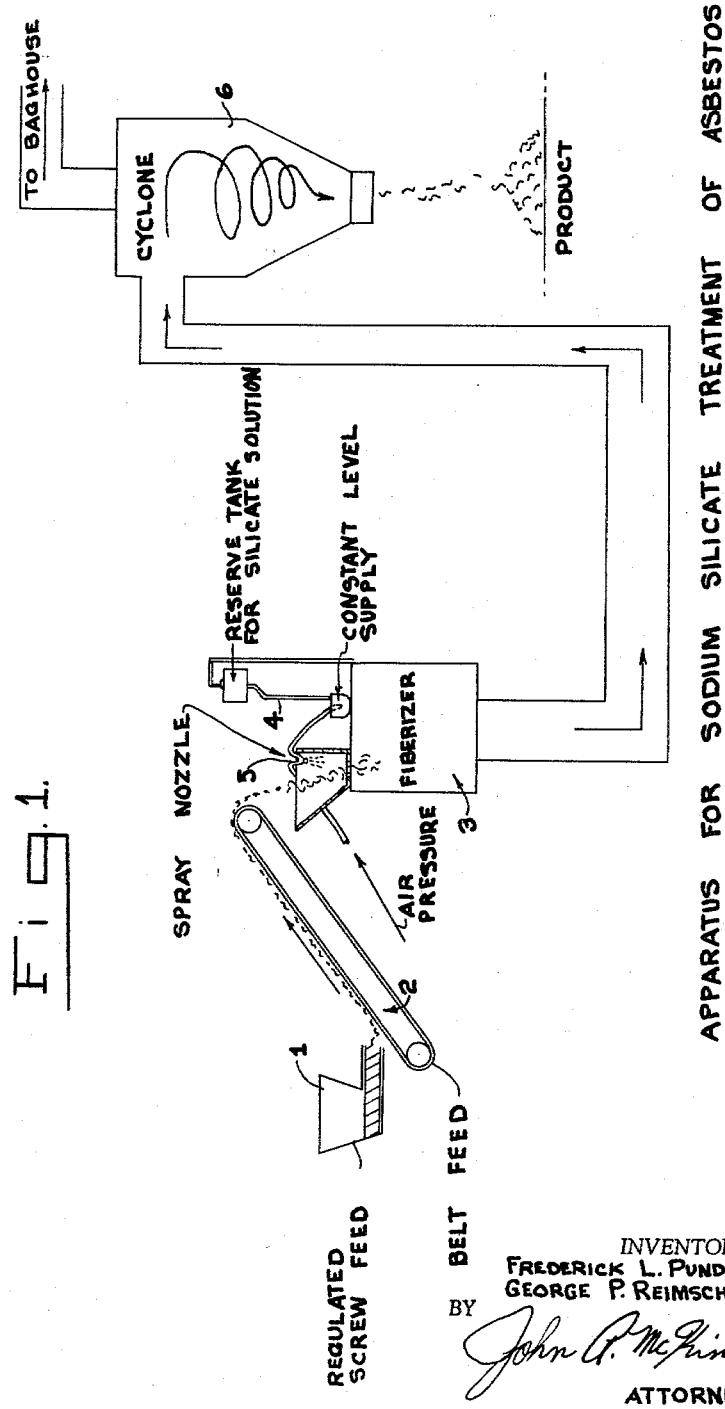

United States Patent Office 3,173,831
Patented Mar. 16, 1965

3,173,831
METHOD OF IMPROVING THE FILTRATION CHARACTERISTICS OF ASBESTOS
Frederick L. Pundsack, Middlesex, and George P. Reimschussel, Flemington, N.J., assignors to Johns-Manville Corporation, New York, N.Y., a corporation of New York
Filed Dec. 29, 1961, Ser. No. 163,235
6 Claims. (Cl. 162—154)

This invention relates to a method of improving the filtration characteristics of asbestos generally and fast filtering asbestos products thereof, and in particular the invention is directed to an improved method of manufacturing asbestos or asbestos-cement and the like products.

Asbestos has for some years been employed in a number of common products such as asbestos-cement boards, sheets, shingles, pipe, etc.; paper and millboard; and assorted fiber reinforced thermal insulating and/or fire resistant structural materials such as 85% magnesia and hydrated calcium silicates, wherein the process of manufacturing includes filtration or percolation-type procedures or mechanisms of passing a liquid, typically water, through or withdrawing it from within a mass or body including asbestos fibers. Exemplary of such conventional manufacturing procedures are the so-called Hatschek wet machine method disclosed in U.S. Letters Patent No. 769,078 and Re. 12,594 and the so-called Norton dry process illustrated by U.S. Letters Patent Nos. 979,547; 979,548; 1,140,702; 1,140,703; 1,140,704; and 1,379,204. Examples of more recent embodiments of these commonly employed wet and dry manufacturing procedures and techniques are illustrated by the Rembert U.S. Letters Patent Nos. 2,182,353; 2,246,537; and 2,322,592, and U.S. Letters Patent No. 2,230,880 to Brown.

The filtration rate or properties of asbestos, however, differ substantially with the source or mine location as well as by type, grade and consistency, ranging from the relatively fast filtering "harsh" fiber to slow filtering "soft" fiber. Typical of the latter class of fiber are asbestos materials normally found in the Quebec, Canada, area. The filtration characteristics of asbestos comprise a significant consideration in determining the suitability or utility of a particular fiber or fiber blend in typical wet process and dry process manufacturing procedures, and these characteristics are particularly decisive in the conventional wet machine processes which are normally employed in the production of asbestos-cement pipe, sheets, or board and shingles.

In the past a number of treatments or means have been proposed and/or evaluated to increase the filtration rate of the slower filtering fibers. They include thermal treatments of the fiber such as the process disclosed in the U.S. Letters Patent No. 2,616,801 to Badollet et al., the application of assorted coatings to the fiber, the use of organic coagulating agents, inorganic salt solutions, soaking in sodium silicate solutions followed by dewatering with an acid treatment to minimize the accelerating effect of sodium silicate on hydraulic cement, etc. However, notwithstanding the disadvantages entailed in the utilization of the slower filtration fiber in wet machine processes, these previously proposed treatments or means of upgrading the filtering characteristics of such asbestos fiber have not been extensively adopted or found significant application because of inherent impediments or disadvantages which render questionable or decidedly outweigh their benefits in the manufacture of asbestos-cement products. For example, such means entail costly and often uneconomical measures and/or while they may increase filtration rates to varying degrees, they frequently result in considerable decreases in the strength of the products incorporating the treated fiber.

Typical of such former techniques is the heat treatment procedure of U.S. Letters Patent No. 2,616,801 which, although markedly upgrading the filtration characteristics of chrysotile fiber with little or no loss in the strength of asbestos-cement compositions embodying the same through the thermal removal of a small but critical proportion of the water of hydration of the asbestos, involves costly and extensive apparatus or means and the process conditions or degree of heating must be rigidly controlled and confined as overheating tends to appreciably decompose the fibrous structure which in turn results in a weak, brittle product. Measures comprising the application of fiber coatings, inorganic salts, etc., produce distinctly adverse effects upon the strength characteristics of the fiber, are costly, and/or frequently produce a detrimental or retarding effect on the "set" of hydraulic cement. Organic coagulating agents have found some application in the manufacture of asbestos-cement products and although effective in coagulating the asbestos fiber or asbestos fiber and cement particles of the slurry into loose flocs which form relatively fast filtering systems, organic coagulants are not readily adaptable for use in pretreating fiber and should be introduced only directly into the feed stock of an asbestos-cement product furnish just prior to dewatering as they are "work sensitive" in that stirring or mechanical working tends to break the flocs apart and they do not re-form. The soaking of asbestos fiber in a sodium silicate solution, although enhancing the filtration rate of asbestos, entails uneconomical and involved measures including partial dewatering, counteracting the accelerating action of the sodium silicate on the "set" of hydraulic cements with an acid, more frequent changing of the process water to control build-up of sodium silicate concentrations and in turn clogging of the machine felt, and is unsuitable for pretreatment of fiber as the sodium silicate residue coheres the fiber when packaged.

It is the primary object of this invention to improve or upgrade the filtration rate or characteristics of asbestos fibers and to provide relatively fast filtering asbestos fiber product slurries or feed stocks which may advantageously be employed in wet process asbestos-cement or the like manufacturing procedures.

It is also an object of this invention to provide an economical, convenient and effective means or procedure for increasing the filtration rate of asbestos fiber without diminishing the physical strength of the fiber, or of the asbestos-cement or the like products comprising the same, or introducing other undesirable characteristics.

It is a further object of this invention to provide a means or procedure for imparting improved or enhanced filtration characteristics to asbestos fiber which are permanent and not lost or materially affected under long term storage.

It is a still further object of this invention to provide an improved economical wet machine process for the manufacture of asbestos-cement products such as pipe, sheet or board, shingles, insulations, and the like, which permits the use of otherwise slow filtering abestos fiber alone or in greater proportions than heretofore possible, or to the exclusion of other fiber.

Other objects and advantages of the present invention will become apparent from the detailed description given hereinafter and it should be understood that the detailed description, while indicating preferred embodiments of the invention, is given by way of illustration only, as variations and modifications within the spirit and scope of the invention will become apparent from the following detailed description.

FIG. 1 comprises a schematic diagram illustrating a suitable apparatus and process for the practice of the instant invention.

Figure 2:
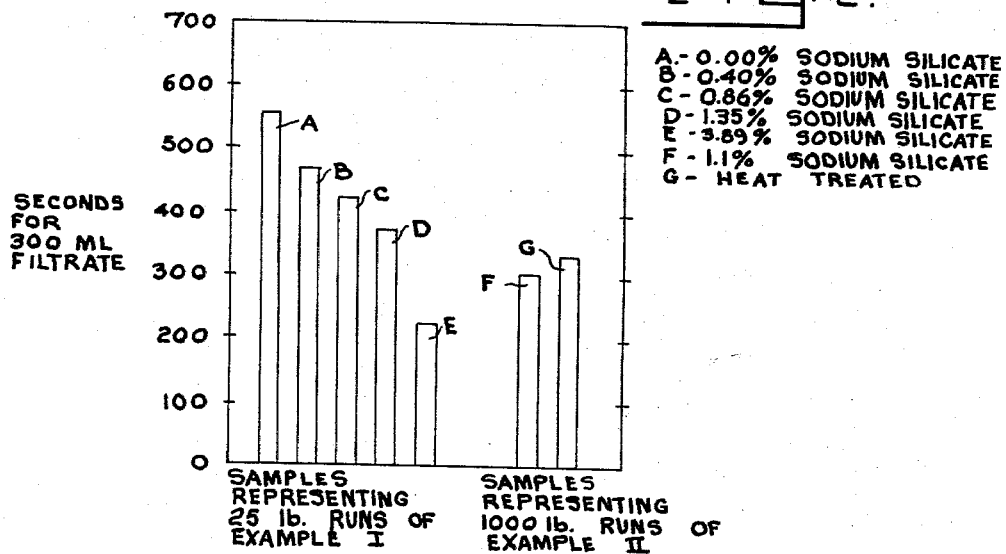

FIG. 2 comprises a graph demonstrating the effects of the method of this invention upon the filtration rate of aqueous slurries comprising asbestos fibers.

Figure 3:
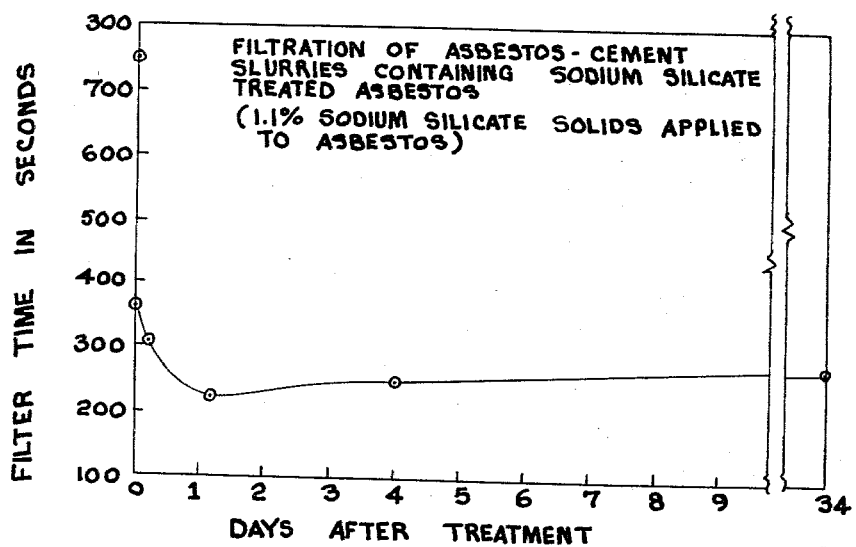

FIG. 3 comprises a graph illustrating the permanence of the effects of the invention.

It has been found that the foregoing objectives, in particular increased filtration rates of asbestos fiber without any appreciable adverse effects upon the strength or other physical and chemical characteristics of the same, are obtainable by applying an atomized spray of an aqueous solution of sodium and/or potassium silicates to asbestos fiber while maintaining the fiber in an air suspension. The concentration of sodium and/or potassium silicate of the aqueous solution and its rate of application to the air suspended fibers are correlated to substantially uniformly deposit approximately 0.10 to 4% by weight of alkali metal silicate solids upon the air suspended asbestos fiber.

More specifically, the method of this invention comprises the application of a sprayable aqueous solution containing from about 3 to 20% by weight, and preferably about 10% by weight, of alkali metal silicate consisting of ordinary commercial grades of sodium and/or potassium silicates having alkali metal to silicate ratios ranging from about 1.60 to 3.75 mols of $SiO_2$ per mol of alkali metal in the form of a finely divided atomized spray to asbestos fibers while said fibers are maintained substantially individually in an air or gaseous suspension such as the condition normally existing in an asbestos fiberizer such as a willow, or upon passing through a fan or blower and in pneumatic conveyance. Alkali metal silicate solutions of the foregoing prescribed consistencies can be effectively and satisfactorily sprayed in a finely divided or atomized condition with typical commercial equipment without clogging. Moreover, in applying the silicate solution as a finely divided spray to fibers in vigorous motion with a rapidly changing air supply, large quantities of the aqueous solution may be added without producing any visible or apparent wetting or cohering of the fiber. The rate of application of the aqueous solution to the air suspended fiber may range up to ratios of approximately 15 or 20% of the aqueous solution based upon the fiber weight, but should be coordinated with the concentration of the solution to produce or result in the deposition of apprximately 0.10 to 4% by weight of the alkali metal silicate solids thereof on the fiber, and most suitably about 1% by weight.

Application of alkali metal silicate solutions to the air suspended fibers may incur a slight increase in the moisture content of the fiber, for example, amounts ranging up to about 10% by weight depending upon the concentration and rate of application of the solution, which may or may not be in part or completely subsequently eliminated. However, the atomized solution being applied to the fibers while they are suspended substantially individually in a supporting air stream, the removal of any added moisture from the treated fibers commences substantially immediately upon completion of the spray application, e.g., withdrawing or passing of the fibers from the area or zone of the spray, and when the treated fibers are subsequently air conveyed, as is typical in conventional fiber processing systems, a substantial amount of any moisture is inherently removed by evaporation. When the thus treated fibers are to be packaged, particularly pressure packaged as is common in the asbestos industry, it may be desirable to remove at least a substantial proportion of any added moisture and/or to reduce the over-all moisture content of the fiber to less than about 8% by weight of the fiber to minimize any tendency of the mass to cohere. Such amounts of added moisture are readily removable by extending the air suspension of the fibers upon removal from the zone or area of spray application or resuspending the fibers, which may be conveniently effected by pneumatically conveying the treated fiber over a relatively short distance and/or the application of warm air for example at 150° F. If, on the other hand, the treated fibers are to be immediately employed in a wet machine process in the manufacture of asbestos-cement products, although the effect or benefits of the treatment appreciate somewhat over the following 24 hours period whereupon equilibrium is reached, the fiber may be added to or employed in the preparation of a slurry furnish stock substantially directly from the hereinbefore described treatment as the accrued advantages would not normally be of a degree to merit further handling.

Without limiting this invention to any theory or explanation, it appears that the atomized spray of alkali metal silicate solution produces a very thin coating upon many of the fibers and fines which in itself alters the ability of the fiber to remain highly dispersed in an aqueous system. This "coating" or application, however, is of such a nature as not to be readily apparent under microscope examination. Moreover, on the basis of observations and examination, indications are that the fiber and fines are agglomerated and that the finely divided alkali metal silicate atomized spray acts in at least two major ways to enhance the filtration rates of the fiber. First, the atomized spray of alkali metal silicate acts to reduce the "effective" fines content of the fiber by agglomerating the fines or adhere them to the fiber with an apparent "gluing" effect. The actual "gluing" or cohering agent would comprise insoluble silica gel formed by reaction of the sodium silicate with atmospheric carbon dioxide. Second, the thin silica gel coating on the fibers and fines reduces their electro-kinetic charge in water and prevents them from forming a highly dispersed system that would give rise to a tight, fine pored, slow filtering cake. This was evidenced most strongly by the air-permeability surface area measurements and also by the elutriation test. The decrease in the air-permeability surface area measurements approximated the increase in filtration rates, thus indicating that the actual pore sizes of a porous media formed from silicate treated fibers are larger than pore sizes produced from a non-treated fiber. Also, analysis of asbestos fiber sprayed with sodium silicate solutions show that essentially all of the $Na_2O$ content of the sodium silicate is in a water soluble form but that practically all of the $SiO_2$ content is insoluble.

Exemplary of an effective and preferred system for carrying out the silicate treating process of this invention is the arrangement of means and technique schematically diagrammed in FIG. 1 of the drawings. The illustrated system of FIG. 1 and its operation are as follows. Screw feed regulator 1 controls the rate of feed of asbestos fiber through the system or process and is set to coordinate the fiber feed rate with a spray solution concentration and application rate to achieve an effectual silicate solids deposition upon the fiber. Conveyor feed belt 2 transports the regulated flow of fiber to fiberizer 3, which in the instant case comprises a conventional asbestos willow, or similar air suspending fiber processing apparatus. A suitable spray device 4 is provided in appropriate proximity to the fiberizer with the spray nozzle 5 thereof positioned to direct the dispersed flow of aqueous solution in the same approximate path as that of the fiber entering the air suspending means whereby the finely divided spray or mist-like droplets of silicate solution provided are distributed and intermingled throughout the fiber as they enter and are briefly maintained substantially individually in the air suspension providing a maximum degree of uniformity of contact between the materials. From the fiberizer 3, the treated fiber is pneumatically conveyed to a cyclone separator 6 wherein the fines fraction is removed and the treated fiber are ejected from the system. As will be observed by those familiar with the processing of asbestos fiber, other than the application of the alkali metal silicate solution and means therefor, the system comprises a substantially conventional process and apparatus for the refining and opening of asbestos fibers.

The relative effectiveness of the atomized spray application of alkali metal silicate solutions, i.e., the extent or degree to which the treatment upgrades or increases the filtration rate of a particular asbestos fiber or asbestos fiber and cement slurry stock, and means for evaluating the same as utilized throughout this application comprise a standard TAPPI Filtration Test, T1002 SM–60, and/or a devised test, referred to hereinafter as the Alpharater test, employed for its convenience and relative accuracy. The devised test for the determination and comparison of relative filtration flow rates comprises an apparatus consisting of a graduated cylinder fitted at the bottom with a 200 mesh stainless steel screen (backed with a 40 mesh screen for support) and a means of maintaining a constant vacuum in a suction flask secured below the cylinder. The vacuum in this flask is controlled either manually in conjunction with a mercury manometer or automatically regulated through the use of a Cartesian Manostat. The following test procedure was employed for asbestos-cement systems. The slurry samples comprised 5 grams of the particular asbestos fiber, 7.5 grams silica, and 12.5 grams Portland cement dispersed in 500 ml. of distilled water. The 2:3:5 ratio of asbestos, silica and cement is typical in the manufacture of many types of asbestos-cement products. To eliminate variables in the watering-out of the asbestos, the fibers alone were pre-soaked in water for 15 minutes. The slurry samples were mixed by rotating the container with water and the fiber end over end for 7 minutes at about 40 r.p.m., then adding the prescribed proportions of cement and silica and continuing mixing for an additional 3 minutes. When the filtration rates of asbestos slurries alone were measured, the preparation procedure was the same as that described except that no cement and silica were added and an uninterrupted 10 minutes mixing cycle was used. The mixed slurry of either asbestos alone, or asbestos-silica-cement was immediately poured into the graduated cylinder of the devised apparatus provided with a brass stopcock at the bottom. The vacuum in the suction flask was adjusted to 40 cm. of mercury and maintained at that pressure (±0.5 cm. of mercury) during the entire run. After a 30 second waiting period to settle turbulence within the slurry, the brass stopcock below the screen was opened and as the meniscus passed the top mark on the graduated cylinder, a stop watch was started, and the time required for the filtration of each 100 ml. of filtrate, up to 300 ml. was measured.

The following examples illustrate preferred and typical procedures for the treatment of asbestos fiber in accordance with this invention and demonstrate the improved filtering characteristics, among others, of the treated asbestos fiber products thereof. It is to be understood that the specific techniques, conditions, materials and/or proportions thereof are merely exemplary and are not to be construed to limit the invention to any data recited in these examples.

The silicate treatments of asbestos fiber in the following examples were effected by means of a system and apparatus such as illustrated by the schematic diagram of FIG. 1 described hereinbefore. The atomizing spray nozzle was secured to the feed hopper on top of the fiberizer in such a manner as to direct the atomized spray downwardly into the fiberizer in a path parallel with fiber dropping from the belt feed into the fiberizer hopper. With this arrangement the fiber and atomized alkali metal silicate spray solution were thoroughly mixed in the fiberizer giving an essentially homogeneous admixture. The spray nozzle employed in each of the following examples, unless otherwise indicated, was ¼ JN with fluid nozzle 60100 and air nozzle 120 of stainless steel and brass manufactured by the Spraying Systems Company. This nozzle, which mixes air and liquid at the nozzle exit, produces a round spray pattern and is designed for both siphoned and gravity feed. An air pressure of 40 p.s.i. was employed with this nozzle.

EXAMPLE I

A series of runs to demonstrate ranges and optimum fiber feed rates, sodium silicate solution concentrations, treated fiber characteristics, etc., were carried out as follows and summarized in Table I. In each run 25 pounds of slow filtering Canadian 4T grade asbestos fiber was fed through the system at the feed rates specified in the table and a sodium silicate solution, having a $Na_2O/SiO_2$ ratio of 1/3.22, was applied thereto in the various concentrations given. There was no difficulty in spraying any of the sodium silicate solutions with the exception of 20% solids concentration solution which exhibited a tendency to evaporate and clog the nozzle when the spray was shut down for brief periods. The fiber run through the process under each of the specified conditions came out of the cyclone in a dry and unclotted condition with less than about 1.5% absorbed water content. The conditions and data for this series of runs and the relative filtration rates for aqueous slurries of fiber from each run in a 2 fiber-3 Portland cement-5 silica weight ratios were as follows:

*Table I*

TREATMENT OF JEFFREY 4T WITH ATOMIZED SODIUM SILICATE SOLUTIONS

| Feed Rate, lb./hour | Solids Conc. of Sodium Silicate Feed Solution, Percent | Nominal Wt. Percent Sodium Silicate Solids Appl. to Fiber,[1] Percent | Filtr. Value for 2:3:5:: asb.:sil.:cem. mixture,[2] sec. |
|---|---|---|---|
| 100 | 0 | 0 | 557 |
| 100 | 3.3 | 0.40 | 474 |
| 100 | 6.6 | 0.76 | 460 |
| 100 | 13.2 | 1.40 | 415 |
| 200 | 10.0 | 0.86 | 424 |
| 200 | 10.0 | 1.35 | 375 |
| 200 | 20.0 | 1.46 | 453 |
| 200 | 20.0 | 2.54 | 365 |
| 400 | 20.0 | 3.89 | 226 |

[1] Calculated with the assumption that the fiber picked up all the sodium silicate solution sprayed on it.
[2] Alpharater filter time for 300 ml. of water.

The relative filtration rates of some slurries comprising fiber from representative 25 pound runs are also comparatively illustrated in FIG. 2 of the drawing.

EXAMPLE II

Sodium silicate solution (Philadelphia Quartz Company, "N" brand with a $Na_2O/SiO_2$ ratio of 1/3.22) diluted to a 10% solids concentration with tap water, was supplied to a feed container from a 5 gallon reserve tank to maintain a constant siphon level and spray applied to slow filtering Canadian grade 4T asbestos fiber as it was fed to the fiberizer. The spray system was adjusted to deliver approximately 175 cc. of sodium silicate solution per minute. The 4T grade asbestos fiber was fed into the fiberizer at a rate of 200 pounds per hour and the run employed a total of 996.5 pounds of fiber. The recovery of treated fiber was 968 pounds, or 97.4% of the feed. A total of 46 liters (12.5 gallons) of a solution containing 10% sodium silicate solids was utilized. If the fiber picked up all the sodium silicate that was sprayed into the system this would provide a silicate solids of 1.1% based on the weight of the fiber feed; however, analysis of the treated fiber established that the fiber pick-up of silicate solids was actually about 0.7% by weight of fiber. Accordingly, the efficiency of the system of this example was about 64% in terms of sodium silicate pick-up by the fiber. The filtration characteristics of an aqueous slurry of fiber-cement-silica containing fiber produced by this run are given and compared with like aqueous slurries of fiber-cement-silica containing untreated and conventionally heat treated (Patent No. 2,616,801 supra) fiber, each in proportions by weight of 2 fiber-3 cement-5 silica, in Table II.

*Table II*

COMPARATIVE PROPERTIES OF SODIUM-SILICATE TREATED FIBER WITH HEAT-TREATED AND UNTREATED FIBER

| Property | Sodium Silicate Treated Fiber | Heat Treated Fiber | Untreated Feed Fiber |
|---|---|---|---|
| Filtration (sec. for 300 ml.) | 309 | 332 | 865 |

The comparative filtration rates of the slurries of sodium silicate and heat treated fibers are also illustrated in FIG. 2.

EXAMPLE III

Several runs, each comprising the silicate treatment of approximately 1000 pound batches of slow filtering Canadian chrysotile fiber, were carried out as follows: A 10% solution of sodium silicate solids, specific gravity 1.08 and $Na_2/SiO_2$ ratio of 1/3.22, was applied in all runs using a Pneumatic Atomizing Nozzle (¼ JN with fluid nozzle 60100 and air nozzle 120, Spraying Systems Company) operating under 40 p.s.i. air pressure. A single nozzle using a 9-inch siphon head was used for the small spray rates involved in preparing the silicate treated fiber at the relatively slow feed rate of 200 pounds of fiber per hour and 2 such nozzles spraying under a 17-inch gravity feed head were used in preparing the silicate treated fiber prepared at the 1000 pound of fiber per hour feed rate. The spray nozzle or nozzles were mounted on the willow hopper in such a manner that the spray was directed toward the center of the willow feed opening. The asbestos fiber, fed by means of the belt conveyor to the willow feed opening, passed in direct contact with the silicate spray as both the spray and the fiber entered the willow and was in contact with the silicate mist during the willowing operation. Upon passing through the willow, the fiber was carried through a fan in the air stream to a cyclone whereupon it was discharged through an air lock. The silicate application concentration and fiber feed rate for each run of 1000 pounds of fiber were as follows:

| Treatment | 10% water added to fiber (Evaluation Control), lb./hr. | 0.5% sodium silicate solids added to fiber, lb./hr. | 1.0% sodium silicate solids added to fiber, lb./hr. | 1.0% sodium silicate solids added to fiber, lb./hr. |
|---|---|---|---|---|
| Rate of Fiber Feed | 200 | 200 | 200 | 1,000 |

The resulting filtration data for the respective products of the runs according to the foregoing treatments are given in Table III.

*Table III*

| Canadian Group 4T Asbestos Fiber | Actual Percent Chemical Added | Feed Rate for Treatment, lbs./hr. | TAPPI Filtration Test Sec., 2 gm. | TAPPI Filtration Test Sec., 4 gm. | TAPPI Filtration Test Sec., 6 gm. | Alpharater Filtration Test Sec., 100 ml. | Alpharater Filtration Test Sec., 200 ml. | Alpharater Filtration Test Sec., 300 ml. | Elutriation Percent Crude | Elutriation Percent Grit |
|---|---|---|---|---|---|---|---|---|---|---|
| Treatment: | | | | | | | | | | |
| None | 0 | 0 | 21 | 79 | 180 | 193 | 452 | 738 | 28.5 | 0.2 |
| Water Spray | 10.0 | 200 | 23 | 73 | 175 | 131 | 342 | 578 | 3.7 | 0.2 |
| Silicate | 0.54 | 200 | 21 | 105 | 143 | 104 | 275 | 469 | 4.2 | 0.2 |
| Do | 1.2 | 200 | 14 | 43 | 82 | 78 | 190 | 313 | 3.8 | 0.2 |
| Do | 1.1 | 1,000 | 5 | 12 | 25 | 59 | 146 | 243 | 10.4 | 0.2 |
| Water Spray | 10.0 | 200 | 42 | 109 | 205 | 132 | 348 | 604 | 1.0 | 0.2 |
| Silicate | 0.54 | 200 | 27 | 103 | 164 | 107 | 304 | 555 | 1.0 | 0.2 |
| Do | 1.2 | 200 | 20 | 52 | 115 | 97 | 259 | 440 | 1.3 | 0.2 |
| Do | 1.1 | 1,000 | 12 | 30 | 44 | 75 | 184 | 305 | 2.5 | 0.2 |
| None | 0 | 0 | 131 | 519 | 682 | 159 | 445 | 824 | | |
| Water Spray | 10.0 | 200 | 130 | 368 | 580 | 156 | 411 | 700 | | |
| Silicate | 0.54 | 200 | 116 | 294 | 505 | 141 | 373 | 636 | | |
| Do | 1.2 | 200 | 86 | 233 | 366 | 122 | 332 | 578 | | |
| Do | 1.1 | 1,000 | 71 | 172 | 268 | 103 | 288 | 515 | | |

Treated 4T asbestos fiber produced by each of the foregoing runs was employed, respectively, in the manufacture of sections of conventional asbestos-cement pipe. The fiber was combined with silica and Portland cement in the ratio of 2 parts by weight of treated 4T asbestos, 3 parts by weight of silica, and 5 parts by weight of cement. The characteristics of asbestos-cement pipe produced from stock incorporating fiber treated in accordance with the foregoing was as follows:

*Table IV*

PIPE MACHINE EVALUATION OF SODIUM SILICATE TREATED 4T FIBERS

| | Water Treatment 10.0%, 200 lbs./hr. Feed Rate | Silicate Treatment 0.54%, 200 lbs./hr. Feed Rate | Silicate Treatment 1.2%, 200 lbs./hr. Feed Rate | Silicate Treatment 1.1%, 1,000 lbs./hr. Feed Rate |
|---|---|---|---|---|
| Machine Variables: | | | | |
| Felt Speed, f.p.m. | 60 | 60 | 60 | 60 |
| Vacuum, in Hg. | 12 | 12 | 12 | 12 |
| Average Form Time, Sec. | 84.5 | 80.4 | 73.3 | 69.2 |
| Ultimate Strength Tests: | | | | |
| Average Hydrostatic MR, p.s.i. | [1] 3,440 | 3,635 | 3,580 | 3,435 |
| Average Flexure MR, p.s.i. | [1] 6,240 | 6,335 | 5,945 | 5,640 |
| Average Normal Crush MR, p.s.i. | [1] 7,355 | 8,210 | 8,285 | 8,060 |
| Average Saturated Crush MR, p.s.i. | [1] 7,315 | 7,965 | 8,180 | 7,930 |
| Density, lb./cu. ft. (Average) | 108.8 | 108.1 | 108.6 | 108.2 |
| Water Absorption, percent (Average) | 20.2 | 19.9 | 20.0 | 20.2 |
| Average Modulus of Elasticity, p.s.i. $\times 10^6$ | 1.08 | 1.13 | 1.12 | 1.10 |

[1] Pipe poorly formed with excessive end stretch.

EXAMPLE IV

The previously given system and technique was employed to apply a 10% sodium silicate solution to asbestos fiber in a willow feed opening while the fiber was in transit at a rate of 1000 pounds an hour. This produced a product with an actual application of about 1.1% silicate solids. The utilization of this fiber in comparison with that of like untreated fiber in the manufacture of asbestos-cement products was as follows:

Asbestos-cement pipe, incorporating about 20%, by weight of the dry furnish, of an asbestos reinforcing fiber component consisting of a blend of one of the following, were prepared in a conventional manner.

| Blend Composition | A | | B | | C | |
|---|---|---|---|---|---|---|
| | Pounds | Percent | Pounds | Percent | Pounds | Percent |
| African Crocidolite (Blue) Fiber | 200 | 16⅔ | 150 | 12.5 | | |
| Canadian Chrysotile Group 4 Fibers | 1,000 | 83⅓ | 300 | 25 | 300 | 25 |
| Sodium Silicate Treated Group 4T Fiber (1% Na₂SiO₃ added and willowed at 1,000 lbs. per hour) | | | 750 | 62.5 | 900 | 75 |
| Total | 1,200 | 100 | 1,200 | 100 | 1,200 | 100 |

Blend A comprises a standard fiber composition for the manufacture of typical asbestos-cement pipe and is given as a control. Fiber blends of compositions B and C were employed in special runs so identified, in the manufacture of pipe according to the conditions and providing the results given in Table V.

EXAMPLE V

Asbestos-cement sheet products comprising compositions given in Table VI were prepared with untreated fiber, sodium silicate treated fiber, and heat treated fiber for comparison.

*Table VI*

SAMPLE FORMULATIONS

| Portland Cement, Percent | Scrap, Percent | Asbestos Fiber, Percent | Fiber Used | Sodium Silicate, Percent | Heat Treatment, °F. | Rate of Treatment, lbs./hr. |
|---|---|---|---|---|---|---|
| 50 | 10 | 40 | 6D | | | Feed |
| 50 | 10 | 40 | 6D | 0.57 | | 200 |
| 50 | 10 | 40 | 6D | 1.19 | | 200 |
| 50 | 10 | 40 | 6D | 1.63 | | 200 |
| 50 | 10 | 40 | 6D | 2.56 | | 200 |
| 50 | 10 | 40 | 6D | | 1,000 | 100 |
| 50 | 10 | 40 | 6D | | | Feed |
| 50 | 10 | 40 | 6D | 0.60 | | 200 |
| 50 | 10 | 40 | 6D | 0.97 | | 200 |

Test sheets of each of the foregoing formulations were formed on a conventional wet process machine at a felt speed of 50 feet per minute, accumulator pressure of 20 p.s.i.g., and a vacuum pressure of approximately 10 inch mercury. No difficulties were encountered in the formation of the sample sheets. Upon formation, the sheets were alternately stacked between plates and screens and repressed for 1 minute at a pressure of 200 pounds per square inch on the sheet. After repressing, the sheets were stripped and air cured for 21 days. The filtration characteristics of the various fiber components and of the slurries comprising the same as employed in the formation of the test sheets are set forth in Table VII.

*Table V*

PIPE MADE OF BLENDS OF SODIUM SILICATE TREATED FIBERS AND THE STANDARD BLENDS

| | Before Run, Standard Fiber Blend | Special Run with Fiber Blend B | Special Run with Fiber Blend C | After Run, Standard Fiber Blend |
|---|---|---|---|---|
| Machine Variables: | | | | |
| Felt Speed, f.p.m. | 108 approx. | 80 approx. | 80 approx. | 108 approx. |
| Vacuum, Inches Hg: | | | | |
| Inverted Box | 7″ | 8–9″ | 8–9″ | 7–9″ |
| Main Box | 3½–4″ | 3½–4″ | 3½–4″ | 3½–4″. |
| Form Time, seconds | 37 avg. | 36 avg. | 34 avg. | 37 avg. |
| Form Pressure | 255 #/line in. constant pres. | 255 #/line in. constant pres. | 255 #/line in. constant pres. | 255 #/line in. and drop to 210 #/line in. at pipe end. |
| Ultimate Strength Tests: | | | | |
| Hydrostatic Tests: | | | | |
| Avg. Load at Failure, p.s.i. | 1,035 | 980 | 1,010 | 1,010. |
| Avg. Modulus of Rupture, p.s.i. | 4,805 | 4,545 | 4,850 | 4,645. |
| Flexure Tests: | | | | |
| Avg. Load at Failure, lbs. | 3,675 | 3,860 | 3,675 | 3,580. |
| Avg. Modulus of Rupture, p.s.i. | 4,205 | 4,340 | 4,205 | 4,005. |
| Normal Crush: | | | | |
| Avg. Load at Failure, lbs. | 8,090 | 7,330 | 7,300 | 7,895. |
| Avg. Modulus of Rupture, p.s.i. | 8,575 | 7,905 | 8,295 | 8,215. |
| Density, lbs./cu. ft., Avg. No. of Tests | 113.8 | 108.2 | 110.3 | 113.4. |
| Water Absorption, Percent, Avg. No. of Tests | 14.7 | 18.2 | 17.4 | 15.0. |
| Modulus of Elasticity in Crushing, p.s.i.× 10⁶, Avg. No. of Tests. | 2.48 | 2.43 | 2.75 | 2.70. |

Table VII
FILTRATION TESTS OF TREATED ASBESTOS FIBER

| Fiber Used | Sodium Silicate, Percent | Alpharater-Fiber Only | | | Alpharater-Fiber and Cement | | | TAPPI Filtration | |
|---|---|---|---|---|---|---|---|---|---|
| | | Sec., 100 ml. | Sec., 200 ml. | Sec., 300 ml. | Sec., 100 ml. | Sec., 200 ml. | Sec., 300 ml. | Sec., 4 gm. | Sec., 6 gm. |
| 6D | Feed | 72 | 226 | 431 | 108 | 318 | 568 | 78 | 201 |
| 6D | 0.57 | 39 | 123 | 236 | 83 | 303 | 455 | 50 | 125 |
| 6D | 1.19 | 24 | 71 | 129 | 72 | 194 | 332 | 38 | 70 |
| 6D | 1.63 | 18 | 53 | 94 | 58 | 155 | 266 | 24 | 43 |
| 6D | 2.56 | 8 | 20 | 33 | 39 | 94 | 154 | 8 | 13 |
| 6D | (1) | 19 | 57 | 113 | 48 | 143 | 250 | 35 | 63 |
| 6D | Feed | 89 | 255 | 455 | 122 | 351 | 610 | 68 | 239 |
| 6D | 0.60 | 39 | 118 | 220 | 95 | 249 | 420 | 75 | 114 |
| 6D | 0.97 | 28 | 75 | 130 | 77 | 190 | 313 | 36 | 74 |

[1] Heat Treated.

EXAMPLE VI

Sodium silicate treated 6D asbestos fiber was employed in the manufacture of asbestos paper by forming hand sheets with starch or latex binders. The paper compositions including standard compositions or controls, the stock characteristics and the physical properties of the resultant papers are given in Table VIII.

Table VIII
EVALUATION OF SODIUM SILICATE TREATED ASBESTOS IN PAPER STOCKS AND HANDSHEETS

| Control | 1 | 2 | 3 | 4 | 5 |
|---|---|---|---|---|---|
| Furnish, percent: | | | | | |
| 6D—blank | 97 | | | | |
| 6D—0.57% Na SIL | | 97 | | | |
| 6D—1.19% Na SIL | | | 97 | | |
| 6D—1.63% Na SIL | | | | 97 | |
| 6D—2.56% Na SIL | | | | | 97 |
| Corn Gum | 3 | 3 | 3 | 3 | 3 |
| Stock pH, approximately (3) | 9 | 9 | 9 | 9 | 9 |
| S.R. Freeness on Fiber (4) | 480 | 525 | 585 | 705 | 820 |
| S.R. Freeness on Stock | 500 | 550 | 630 | 705 | 805 |
| Buoyancy Test, 30 grams on Fiber, 2,000 ml. (5): | | | | | |
| 1 min | 1,020 | 1,180 | 930 | 640 | 460 |
| 5 min | 800 | 960 | 780 | 560 | 420 |
| 1 hr | 520 | 630 | 610 | 520 | 420 |
| 3 hr | 480 | 600 | 600 | 500 | 420 |
| Physical Properties: | | | | | |
| Basis Weight, lb./100 ft.$^2$ | 4.7 | 4.7 | 4.7 | 4.6 | 4.7 |
| Caliper, mils | 13 | 13 | 12 | 13 | 14 |
| Bulk, percent | 0.27 | 0.27 | 0.26 | 0.27 | 0.29 |
| Mullen, p.s.i. | 6 | 6 | 5 | 4 | 3 |
| Tensile, lbs./in. | 12.5 | 11.5 | 10.0 | 5.1 | 3.6 |
| Stretch, percent | 0.7 | 0.6 | 0.5 | 0.5 | 0.4 |
| Tear, grams | 58 | 59 | 61 | 49 | 30 |
| Gurley Stiffness, grams | 1.0 | 1.1 | 1.0 | 0.8 | 0.7 |
| Gurley Densometer, sec./100 cc. | 79 | 54 | 36 | 19 | 8 |
| Kerosene value | 55 | 58 | 61 | 65 | 67 |
| Ash in fiber, percent | 87.4 | 87.6 | 87.6 | 87.6 | 87.6 |
| Ash in handsheet, percent | 84.95 | 84.5 | 84.4 | 85.0 | 85.0 |
| Percent Organic in Handsheet | 2.8 | 3.4 | 3.7 | 2.9 | 2.9 |

EXAMPLE VII

Canadian 4T asbestos fiber containing 1.1% sodium silicate solids, prepared in accordance with the foregoing examples, was employed in the manufacture of conventional asbestos fiber reinforced calcium silicate thermal insulations formed by the hydrothermal reaction of lime and silicate. The characteristics of the slurry and product are given in Table IX along with comparable data for an identical product incorporating an untreated 4T fiber.

Table IX

| | Block with Untreated Fiber | Block with 1.1% Sodium Silicate Treated Fiber |
|---|---|---|
| 2" x 12" x 36" block: | | |
| Density at 70 GH | 13.40 | 13.55 |
| MR at 11 p.c.f. | 98 | 90 |
| Green hardness at 11 p.c.f. | 25 | 46 |
| Avg. sec. press stroke | 25.3 | 27.6 |
| Avg. delamination rating | 0.05 | 0.03 |
| Avg. length shrinkage 1/32 in. | 1.50 | 2.70 |
| Cement filtration of fiber on Alpharater Sec. for 300 ml. | 578 | 313 |

EXAMPLE VIII

The utility of solutions of potassium silicate and alkali metal silicates of a wide range of alkali metal to silica ratios is demonstrated by the following example.

Like samples of 4T asbestos fiber were treated with an atomized spray of an aqueous solution containing a 10% solids concentration of an alkali metal silicate of the given compositions. The alkali metal silicate spray was directed into the willow feed opening and the fiber was fed therewith through the system at a rate of 1000 pounds per hour. The application rate of the silicate solution was adjusted so that the fiber would have absorbed or retained approximately 1% of silicate solids based upon the weight of the fiber. The filtration rate of a slurry of 2 parts by weight fiber, 3 parts by weight silica, and 5 parts by weight Portland cement was determined with the Alpahrater test to determine the relative effects of the treatment.

Table X
FILTRATION TIME FOR 300 ML. SAMPLES OF AN AQUEOUS SLURRY OF FIBER SILICA CEMENT IN A WEIGHT RATIO OF 2:3:5

| Alkali Metal Silicate Used | Percent by Weight Applied to the Fiber | Seconds to Filter |
|---|---|---|
| $Na_2O/SiO_2=1:3.75$ | 1.02 | 265 |
| $Na_2O/SiO_2=1:3.22$ | 1.00 | 250 |
| $Na_2O/SiO_2=1:2.00$ | 1.05 | 289 |
| $K_2O/SiO_2=1:2.50$ | 1.05 | 284 |
| Untreated 4T fiber | | 755 |

The effect of the passage of time and the permanence of the characteristics of the silicate treated fiber are illustrated by the graph of FIG. 3. This figure shows the filter time in seconds of an asbestos-cement aqueous slurry of 5 parts by weight Portland cement, 3 parts by weight silica, and 2 parts by weight asbestos fiber containing 1.1% by weight sodium silicate solids deposited thereon by the procedure of Example II. The filtration data was determined by Alpharater tests over an extended period of time. It is apparent that the treatment is effective to a relatively high degree substantially immediately upon application whereby the treated fiber may be directly employed in a manufacturing process. Also, the long term permanence of the effect of the subject silicate treatment permits its application at the asbestos mine or mill and packaging, including pressure packaging without subsequent cohering or sticking, with storing and/or shipping for utilization at some future date.

Asbestos fibers treated with alkali metal silicates in accordance with this invention can be effectively employed, either alone or with conventional asbestos or other fiber, in the manufacture of typical asbestos-cement or the like calcareous products in various proportions ranging up to about 60 or 70% of asbestos by weight of the product, but more typically in amounts of about 10 to 40% by weight of the product depending, of course, upon the necessary or desired characteristics of the particular article embodying the same. Moreover, the treated fibers of this invention are applicable to normal cured, water cured and steam cured asbestos-cement compositions or products as well as those comprising the common hydraulic cements including Portland, slag and aluminous cements, silica either as a reactant and/or filler, and the assorted fillers, pigments, etc., commonly utilized in this industry.

It will be understood that the foregoing details are given for the purposes of illustration, not restriction, and that variations within the spirit of this invention are intended to be included within the scope of the appended claims.

What we claim is:

1. The method of manufacturing asbestos-cement articles which comprises applying an atomized spray of aqueous solution of alkali metal silicate selected from the group consisting of sodium and potassium silicates and mixtures thereof to an air suspension of asbestos fiber and depositing thereon alkali metal silicate solids in amount of approximately 0.10 to 4% by weight of the asbestos fiber, dispersing the silicate-containing fiber in a dilute aqueous feed slurry comprising hydraulic cement, collecting and withdrawing a wet layer comprising asbestos fiber and cement from the said slurry.

2. The method of manufacturing asbestos-cement articles which comprises applying an atomized spray of aqueous solution comprising 3 to 20% by weight of alkali metal silicate selected from the group consisting of sodium and potassium silicates and mixtures thereof to an air suspension of asbestos fiber and depositing thereon alkali metal silicate solids in amount of approximately 0.10 to 4% by weight of the asbestos fiber, dispersing the silicate-containing fiber in a dilute aqueous feed slurry comprising hydraulic cement and silica, collecting and withdrawing a wet layer comprising asbestos fiber, hydraulic cement and silica from the feed slurry on a foraminous collector roll, transferring said wet layer to a revolving accumulating element, and building up a laminated composite asbestos-cement article.

3. The method of producing asbestos containing products comprising dispersing the constituents thereof including the asbestos fiber in water and forming the product by collecting and withdrawing said constituents from the water, said method comprising improving the filtration characteristics of the asbestos component by applying an atomized spray of an aqueous solution of alkali metal silicate selected from the group consisting of sodium and potassium silicates and mixtures thereof to an air suspension of the asbestos fiber and depositing alkali metal silicate solids upon said fiber in amount of approximately 0.1 to 4% by weight of the asbestos fiber, then dispersing the constituents including the thus treated fibers in water and forming the product by collecting the constituents comprising asbestos and filtering the water therefrom.

4. The method of producing asbestos containing products comprising dispersing the constituents thereof including asbestos fiber in water and forming the product by collecting and withdrawing said constituents from the water, said method comprising improving the filtration characteristics of the asbestos component by applying an atomized spray of an aqueous solution comprising approximately 3 to 20% by weight of alkali metal silicate selected from the group consisting of sodium and potassium silicates and mixtures thereof to an air suspension of the asbestos fiber and depositing thereon the alkali metal silicate solids in amount of approximately 0.10 to 4% by weight of the asbestos fiber, then dispersing the constituents including the thus treated asbestos in water and forming the product by collecting the constituents including asbestos and filtering the water therefrom.

5. The method of producing asbestos containing products comprising dispersing the constituents thereof comprising asbestos fiber in water and forming the product by collecting and withdrawing said constituents from the water, said method comprising improving the filtration characteristics of the asbestos component by applying an atomized spray of an aqueous solution comprising approximately 10% by weight of an alkali metal silicate selected from the group consisting of sodium and potassium silicates and mixtures thereof to an air suspension of asbestos fiber and depositing thereon alkali metal silicate solids in amount of approximately 1.0% by weight of the asbestos fiber, then dispersing the constituents including the thus treated fiber in water and forming the product by collecting the constituents comprising asbestos and filtering the water therefrom.

6. The method of producing an asbestos fiber product of improved filtration characteristics which comprises suspending asbestos fiber in air and applying to the air suspended fiber and atomized spray of an aqueous solution of alkali metal silicate selected from the group consisting of sodium and potassium silicates and mixtures thereof and depositing on the air suspended fiber alkali metal silicate solids in amount of approximately 0.10 to 4% by weight of the said fiber thereby forming an asbestos fiber product having the property of an increased filtration rate.

References Cited by the Examiner
UNITED STATES PATENTS

| | | | |
|---|---|---|---|
| 1,872,480 | 8/32 | Maust | 162—154 |
| 2,162,386 | 6/39 | Nauhof | 162—181 |
| 2,220,386 | 11/40 | Badollet | 162—154 |
| 2,273,313 | 2/42 | Clapp | 162—181 |
| 2,554,934 | 5/51 | Ayers | 162—181 |
| 2,568,023 | 9/51 | Perry | 162—154 |
| 2,791,159 | 5/57 | Lillis | 162—154 |
| 2,902,399 | 9/59 | Paquin | 162—181 |
| 3,014,835 | 12/61 | Feigley | 162—181 |
| 3,045,316 | 7/62 | Gilhart | 156—26 |
| 3,050,427 | 8/62 | Slayter | 156—26 |

DONALL H. SYLVESTER, *Primary Examiner.*

MORRIS O. WOLK, *Examiner.*